(12) United States Patent
Klinger

(10) Patent No.: US 9,046,897 B2
(45) Date of Patent: Jun. 2, 2015

(54) SYSTEM FOR MONITORING AND CONTROLLING THE PERFORMANCE OF AN ENVIRONMENTAL CONTROL UNIT

(76) Inventor: Barney Klinger, Valencia, CA (US)

( * ) Notice: Subject to any disclaimer, the term of this patent is extended or adjusted under 35 U.S.C. 154(b) by 833 days.

(21) Appl. No.: 13/207,873

(22) Filed: Aug. 11, 2011

(65) Prior Publication Data

US 2012/0041602 A1 Feb. 16, 2012

Related U.S. Application Data

(60) Provisional application No. 61/373,532, filed on Aug. 13, 2010.

(51) Int. Cl.
*G05D 23/19* (2006.01)
(52) U.S. Cl.
CPC .................................. *G05D 23/1905* (2013.01)
(58) Field of Classification Search
None
See application file for complete search history.

(56) References Cited

U.S. PATENT DOCUMENTS

| | | | |
|---|---|---|---|
| 5,282,127 A | 1/1994 | Mii | |
| 5,909,378 A | 6/1999 | De Milleville | |
| 6,385,510 B1 | 5/2002 | Hoog et al. | |
| 6,553,336 B1 * | 4/2003 | Johnson et al. | 702/188 |
| 6,633,800 B1 * | 10/2003 | Ward et al. | 701/2 |
| 6,795,799 B2 | 9/2004 | Deb et al. | |
| 6,889,173 B2 | 5/2005 | Singh | |
| 7,383,158 B2 * | 6/2008 | Krocker et al. | 702/186 |
| 2003/0114994 A1 | 6/2003 | Wada | |
| 2005/0049753 A1 * | 3/2005 | Garcia-Ortiz | 700/275 |
| 2009/0228149 A1 * | 9/2009 | Alston | 700/276 |

* cited by examiner

*Primary Examiner* — Sean Shechtman
*Assistant Examiner* — Steven Garland
(74) *Attorney, Agent, or Firm* — Kelly & Kelley, LLP

(57) ABSTRACT

An system for monitoring the performance of a mobile environmental control unit (ECU) includes sensors for monitoring and detecting operating parameters of the ECU. A monitor processing and communications unit is coupled to the sensors for receiving and processing the operating parameter data signals from the sensors and relaying the processed operating parameter data signals to a computerized graphical user interface display via a network. The processed operating parameter data signals are graphically displayed to technical support personnel for determining problems or performance issues which may exist or may occur on an ECU remotely and offer corrective action.

22 Claims, 7 Drawing Sheets

SYSTEM FOR MONITORING AND CONTROLLING THE PERFORMANCE OF AN ENVIRONMENTAL CONTROL UNIT

BACKGROUND OF THE INVENTION

The present invention is generally related to environmental control units (ECUs), and the maintenance and control of the same. More particularly, the present invention is directed to a device and system for remotely monitoring and controlling mobile environmental control units, such as military ECUs.

Military use environmental control units are unique in their design, construction, and performance objectives. These ECUs are responsible for cooling personnel living/working areas, mobile field hospitals, mobile radar, communications, and air traffic control stations, and for cooling high power electronic equipment. Failure of the ECU would result in the inability to complete military missions due to equipment failures or overheating.

In most cases, these ECUs are deployed to austere environments in extremely dusty, dry, and arid climates or locations that are extremely remote, frigid, and/or continually wet. Because of the harsh environments the ECUs are subjected to, and the importance their role plays in the big picture of military tactical plans, almost all ECUs are subject to the military standards for environmental protection. The ECUs have to perform their functions in every extreme.

One of the biggest hurdles the military faces is their inability, due to either lack of training or inadequate service personnel, to troubleshoot, diagnose, and adjust the ECUs when they are not performing optimally. More often than not, performance issues are caused by incorrect settings by operating personnel, airflow obstructions, incorrect or improper preventative maintenance, incorrect refrigeration charge, or improperly adjusted superheat/sub-cooling settings.

The current remedies for improperly functioning equipment include: 1) operating personnel attempt to adjust, troubleshoot, and/or repair the ECU using limited knowledge about how the refrigeration system operates, which most times results in further degradation of the ECU or damage to equipment; 2) the operator acquires a replacement system if one is locally available and the improperly functioning unit is removed and shipped to the manufacturer for repair; or 3) technical support personnel from the manufacturer are requested, resulting in expensive travel and labor rates both for the customer and for the manufacturer.

The problem with all three of the remedies listed above is that there is a vast amount of time and money wasted for the same outcome. The units do not get adequately repaired, and are prone to additional failures, and tactical missions are aborted due to secondary equipment failures occurring due to lack of cooling air provided by the ECU. In many cases, field service technicians cannot get to the equipment location in an expeditious manner because of the wide range of deployed locations inside hazardous areas. This leaves the end user, the military personnel in the field, without the support they need.

Accordingly, there is a continuing need for a system for remotely monitoring, troubleshooting and controlling mobile ECUs, such as those used in the military. The present invention fulfills these needs and provides other related advantages.

SUMMARY OF THE INVENTION

The present invention resides in a system for monitoring and controlling the performance of an environmental control unit. The system generally comprises a mobile ECU, such as a mobilized military ECU. Sensors monitor and detect operating parameters of the ECU, such as temperature, pressure, air velocity, and electrical current operating parameters of the ECU. Typically, the sensors are formed integral with the ECU.

A device, referred to herein as a monitor processing and communications unit, is coupled to the sensors for receiving and processing operating parameter data signals from the sensors and relaying the processed operating parameter data signals. Typically, the monitor processing and communications unit is detachably coupled to the sensors and the ECU. The monitor processing and communications unit may be military ruggedized, particularly if the ECU is a mobilized military ECU.

A computerized graphical user interface display is in communication with the monitor processing and communications unit for graphically displaying the processed operating parameter data signals. Typically, the computerized graphical user interface display is connected to the monitor processing and communications unit via an Internet network. The network may comprise a local area network (LAN) or a wide area network (WAN). In the case of a WAN, the ECU and monitor processing and communications unit are at the same location and the computerized graphical user interface displays at a remote location and in communication with the monitor processing and communications unit for remotely monitoring and controlling the operation parameters of the ECU. Means are provided for selectively switching control of the operation of the ECU between local and remote control.

The monitor processing and communications unit comprises means for receiving and processing sensor data signals, means for relaying process sensor data signals to the computerized graphical user interface display, and means for controlling operating parameters of the ECU. More particularly, the monitor processing and communications unit or device comprises a temperature module that receives and processes temperature data signals from ECU temperature sensors, and relays heating, fan and cooling commands received from the computerized graphical user interface display to the ECU. An analog module is also within the housing of the device and receives and processes pressure, air velocity and current sensor signals of the ECU. An Ethernet switch is in communication with the temperature module, the analog module, and the computerized graphical user interface display. A voltage transducer and power supply receives and converts power from the ECU and delivers power to the temperature module, the analog module and the Ethernet switch.

The monitor processing and communications device includes a first cable connector port extending through the housing for detachably connecting the device to the ECU and receiving pressure, air velocity and current data signals from the ECU. The first cable connector is in communication with the analog module. A second cable connector port extends through the housing and is in communication with the temperature module. The second cable connector port detachably connects the device to the ECU and receives temperature data signals from the ECU, and is used to relay heating, fan and cooling commands to the ECU. A data connector port is in communication with the Ethernet switch and detachably connects the device to the computerized graphical user interface display.

The system of the present invention offers a level of control over an ECU, allowing operating personnel to troubleshoot, adjust or analyze the different systems within the ECU from a remote location without requiring physical access to the equipment. Technical support personnel are able to see, in real time, what problems or performance issues may exist or may occur on an ECU remotely and offer corrective action.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention is directed to a system for controlling and monitoring environmental control units. The invention is particularly adapted to controlling and monitoring military environmental control units remotely.

The system of the present invention measures, logs and analyzes air temperatures, airflow, refrigeration system temperatures and pressures, electrical control voltage and incoming system current of an environmental control unit (ECU). Through a series of digital temperature sensors and transducers installed within the ECU, a monitor processing and communications unit coupled to the ECU processes and analyses those temperature and pressure signals which have an effect on system performance. The system includes provisions for remote monitoring of this data when connected via a network through the Internet, such as on a specific Internet Protocol (IP) address. Thus, technical support personnel can see, in real time, what problems or performance issues may occur on an ECU remotely and offer corrective action.

Figure 1:
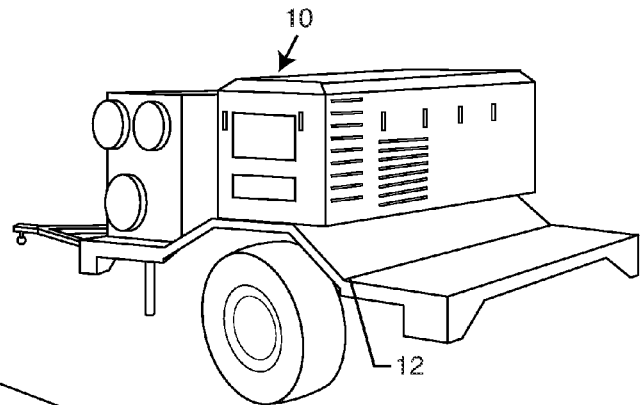
FIG. 1 is a side perspective view of an environmental control unit (ECU) disposed on a trailer so as to be mobile.
Figure 2:
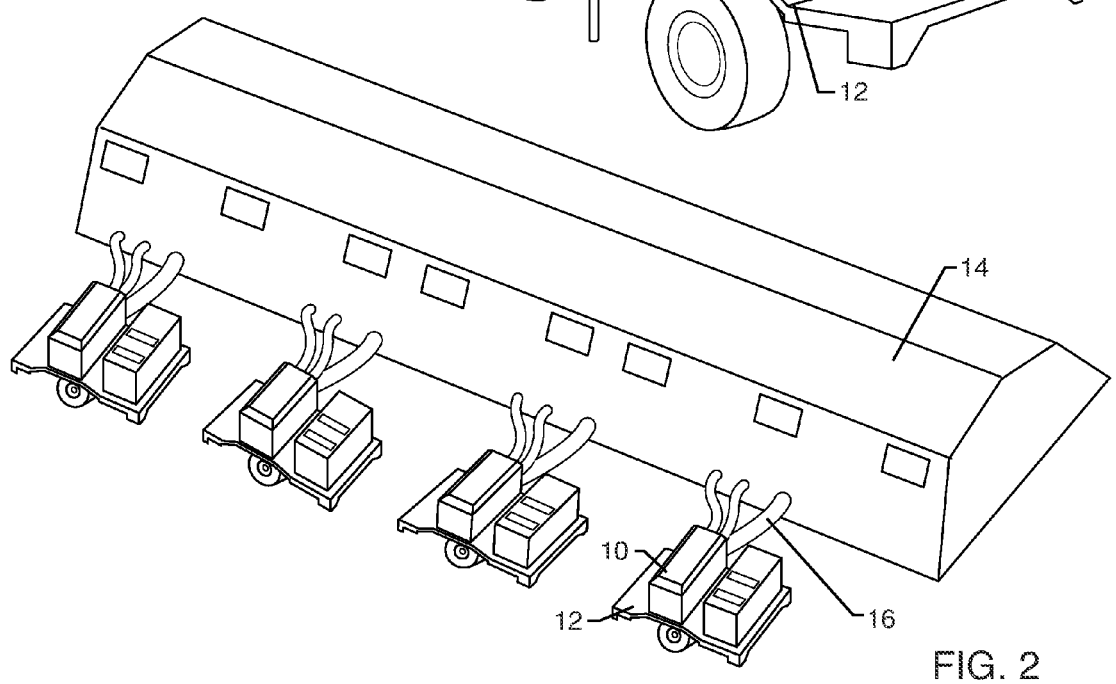
FIG. 2 is a perspective diagrammatic view of a plurality of mobile ECUs operably connected to a human occupiable structure.

The system of the present invention is specifically targeted towards use on mobile military ECUs, and is intended to be used as a field service and analysis tool to allow military equipment to be locally or remotely maintained and its performance optimized. With reference to FIG. 1, an ECU 10 disposed on a mobile trailer 12, so as to be moved from one location to another utilizing a vehicle is shown. FIG. 2 illustrates a plurality of such mobile ECUs 10 operably coupled to a structure 14 for heating or cooling the structure 14. This is accomplished by means of vents and tubing 16 which extend from the ECU 10 to the structure 14 for providing ventilation and circulating heating or cooled air from the ECU 10 to the structure 14. It will be appreciated by those skilled in the art that the structure 14 can comprise any known military structure, such as a mess tent, living quarters, portable medical facility, etc.

It is well known that military personnel are required to travel to and operate in very harsh conditions. These locations are often in remote areas including desert, woodlands, swamps, etc. The weather and temperature encountered in such locations can vary significantly as well. ECUs are used to heat, cool, and/or dehumidify the air within such structures as is needed. Of course, the ECUs 10 must be mobile in order to accomplish these objectives.

Figure 3:
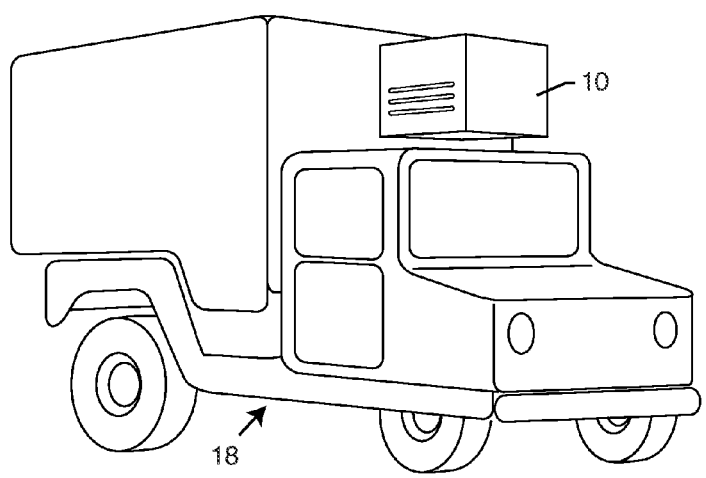
FIG. 3 is a perspective view of a vehicle having an ECU operably connected thereto.

With reference now to FIG. 3, a vehicle 18, such as a humvee or other military vehicle is illustrated having an ECU 10 operably connected thereto. In the modern military, it is very common to have vehicles with sensitive electronic equipment therein. For example, humvees or other military vehicles may include electronic jamming, satellite communications, or weapons control electronic equipment, sensors, transceivers, and the like. Even tanks and other vehicles include sensitive electronic equipment. The electronic equipment can fail or their performance impaired under extreme temperature environments. For example, such electronic equipment generates a large amount of heat which must be dissipated. Aside from the comfort of the military personnel operating such equipment, it is desirable and even necessary to maintain the temperature of such systems within a certain range so that the heat can be dissipated and the electronic equipment perform as necessary. Thus, ECUs are incorporated into such vehicles, as illustrated in FIG. 3, or ECUs are detachably coupled to such vehicles and systems when in use in the field.

If the ECUs fail to perform the consequences can range from being uncomfortable to disastrous. If the ECU fails, the high-tech electronic equipment which may be used for air traffic control, missile detection, surveillance, medical care, etc. can overheat and shut down. Military personnel are trained in these systems, weapons, combat and the like, but not typically in the maintenance and repair of such ECUs.

In such instances, a replacement ECU may be swapped for the defective ECU. In other instances, the military personnel contact the provider or maintainer of such ECUs, such as by wired or wireless communications. The manufacturer or service technician may be many thousands of miles away from the deployed ECU and uncertain of the problems the ECU is experiencing. In some cases, the ECU must either be returned to the manufacturer or a service technician sent to the deployed area to maintain or repair the ECU. Of course, this creates a large expense.

Moreover, the vast majority of ECU failures are caused by improper maintenance, airflow blockages caused by dirty filters or obstructions, dirty coil surfaces or low refrigerant charges. If the remote service technician could determine the failure of these operating parameters, the technician could quite easily convey the necessary instructions to the military personnel in the field to resolve the problem in most cases. Furthermore, if the military personnel were provided with an easy-to-use interactive graphic display, the military personnel could potentially determine corrective action on site.

Figure 4:
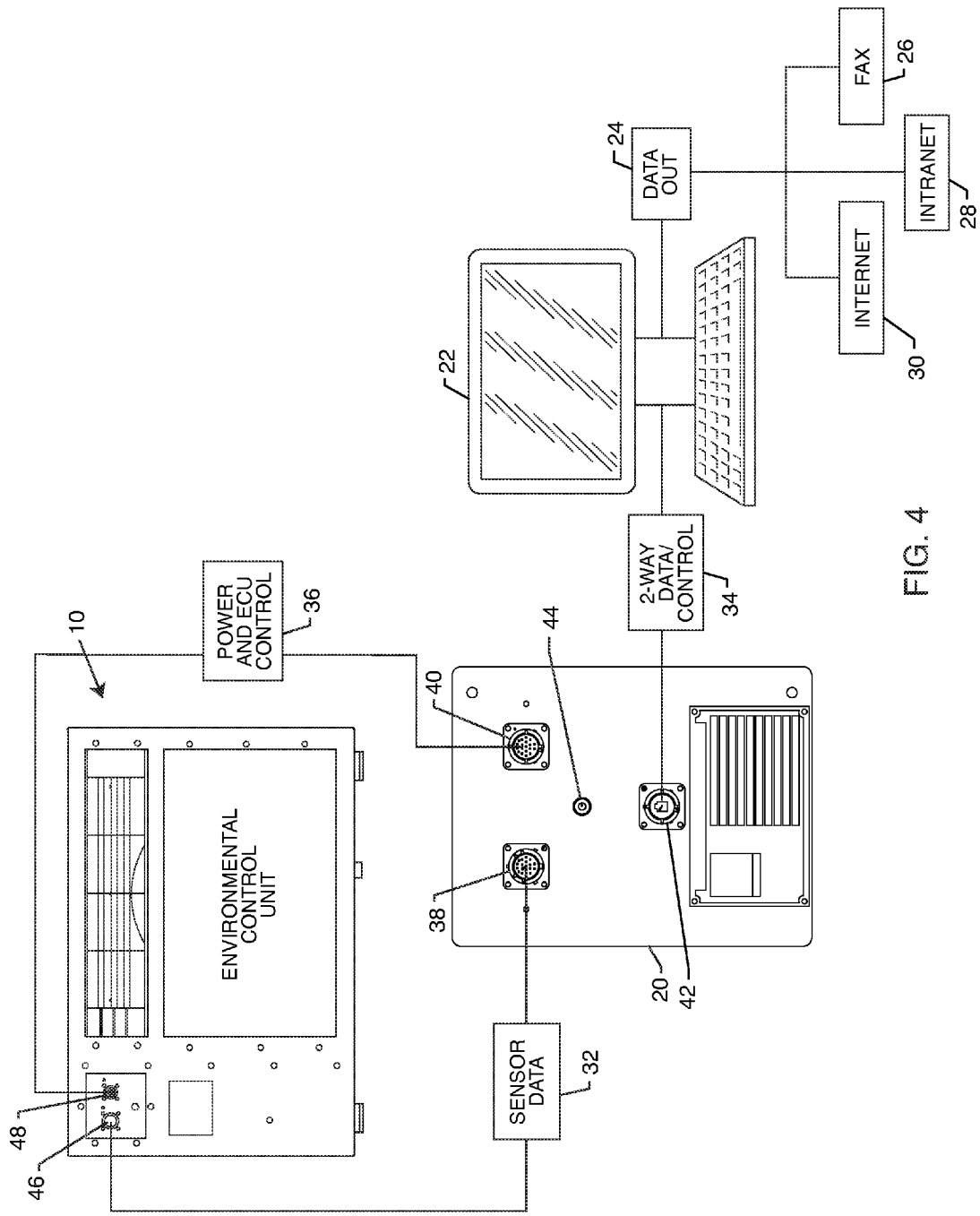
FIG. 4 is a diagrammatic view illustrating the components of the system of the present invention.
Figures 5, 6:
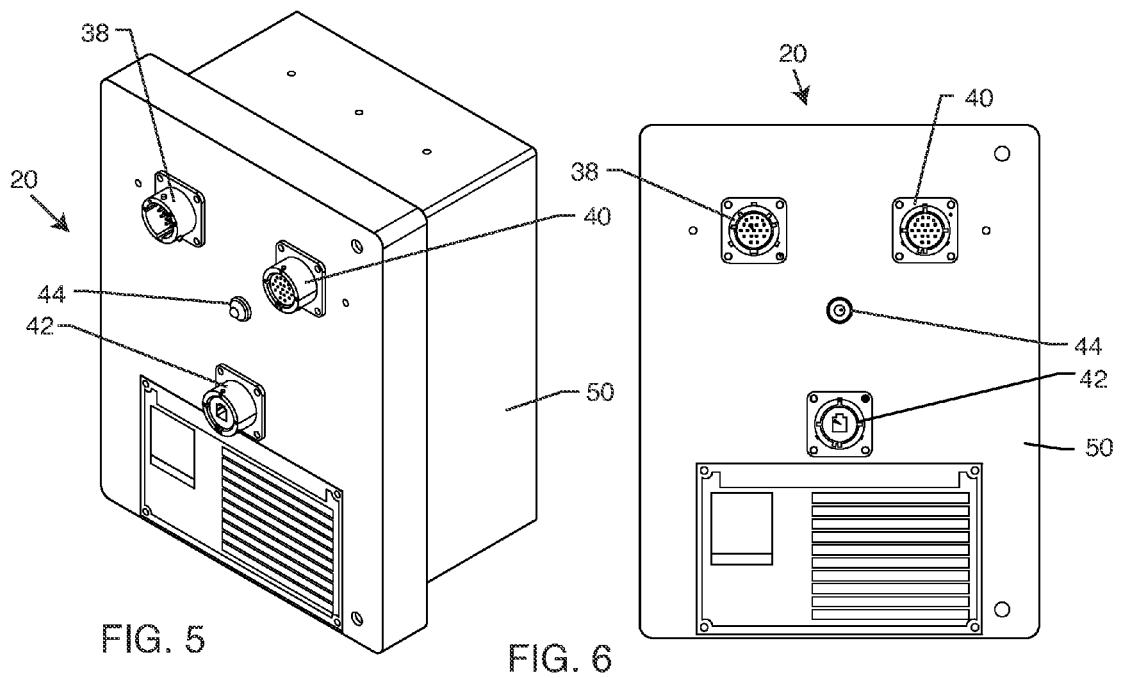
FIG. 5 is a perspective view of a monitor processing and communications unit used in accordance with the present invention.
FIG. 6 is a front elevational view of the monitor processing and communications unit of FIG. 5.

With reference now to FIG. 4, an exemplary ECU 10 is shown and coupled so as to be in electronic communication with a monitor processing and communications unit 20 used in accordance with the present invention. In a particularly preferred embodiment, the ECU includes or is retrofitted so as to include various transducers and sensors which relay data regarding various operating parameters of the ECU, including return and supply air temperatures, ambient air and condenser exhaust air temperatures, super-heat and sub-cool temperatures, control voltage and main power current, airflow rate, and head and back pressures of the ECU. The data signals from these transducers and sensors are sent to the monitor processing and communications unit 20 to be processed.

The processed operating parameter data signals are then sent to an interactive graphical user interface display 22, which can comprise any computerized graphical interface such as a laptop computer, desktop computer, hand-held computerized device having a display screen or the like. An algorithm, in the form of software, is accessible by or downloaded onto the computerized graphical user interface display device 22 such that the display device 22 can receive and graphically interpret the processed operating parameter data signals from the monitor processing and communications unit 20 so as to create a graphic display for the military personnel or remote technician. For example, bar graphs, line figures, or the like may be used to show whether certain operating parameters of the ECU are within established norms or outside of the norms. Messages, alerts and the like can also be provided to the end user at the display device 22.

The computerized graphical user interface display device 22 may be used and operated by the military personnel at the same location as the monitor processing and communications unit 20 and ECU 10. In such case, the local computerized graphical interface device 22 may either be accessed by a remote computer or in communication with a remote computer or provide such information to a remote technician by sending the data out 24 via a fax message 26, via a network, such as via a Local Area Network or Intranet 28 or via an Internet connection with a Wide Area Network or Internet 30.

It is contemplated by the present invention that a military unit, vehicle, etc. deployed in the field and some distance away from a main base may experience problems with an ECU 10. The monitor processing and communications unit 20 of the present invention can be coupled to the ECU 10 so as to receive the sensor data 32 therefrom. This processed sensor data can be sent directly to the local command center in the field where a qualified technician may be based, such as using wireless communications devices which may comprise a local area network or Intranet or the like. The military personnel at the location of the ECU 10 and monitor processing and communications unit 20 may or may not have a computerized graphic interface display device 22. The circumstances may be that there is no qualified technician deployed in the field at that time. In such case, the processed sensor data from the monitor processing and communications unit 20 is sent to a service technician or manufacturer of the ECU 10, which may reside hundreds of miles or even possibly in another continent away from the deployed ECU 10. This information can be conveyed via fax 26 or an Internet connection 30 or any other suitable means.

Upon receiving such information, the qualified service technician can communicate with the military personnel in order to take corrective measures, or the service technician (either at the location of the ECU, the command post, or the remote manufacturer or service company) can send commands using the software and by means of the computerized display device 22 through the monitor processing and communications unit 20 to the ECU 10 so as to control various operating parameters of the ECU 10. As such, the communications link between the monitor processing and communications unit 20 and the computerized graphical display device 22 is typically a two-way data/control link. In a particularly preferred embodiment, the two-way data/control link 34 comprises the Internet via a LAN/WAN or Internet connection via Internet Protocol (IP) addresses. As such, the monitor processing and communications unit 20 and the ECU can be remotely accessed through the Internet or other network to control the ECU 10 functions.

With reference now to FIGS. 4-7, the monitor processing and communications unit 20 includes means for receiving the sensor data 32 and receiving and sending the power and ECU control signals 36. A cable connector port 38 is adapted to be coupled with a connector at the end of a cable or wiring harness which is coupled to the ECU 10 for receiving the sensor data 32 from the ECU 10. A second cable connector port 40 is capable of connecting or mating with a corresponding connector of a wiring harness extending to the ECU 10 for receiving and transmitting power and control ECU signals 36. A data connector port 42, such as an RJ45 data connector, receives a corresponding communications cable, such as a CAT-5E cable, for providing two-way communication between the monitor processing and communications unit 20 and the computerized display device 22. A light 44, such as an LED, is typically also included so as to indicate that the monitor processing and communications unit 20 is receiving power from the ECU 10 and functioning.

It will be noted that the cable connectors 38 and 40, in particular, enable the detachable connection to wiring harnesses containing the wires and cables for the sensor data 32 and power and ECU control data 36, which are similarly detachably connected to the ECU 10 at ports 46 and 48. Thus, the monitor processing and communications unit 20 is detachably connected to the ECU 10 in a particularly preferred embodiment. As such, the monitor processing and communications unit 20 need not be necessarily permanently or continuously connected to the ECU. Although it may be desirable to have the monitor processing and communications unit 20 connected to an ECU on a prolonged or even continuous basis so as to monitor the operation of the ECU 10 and report operating parameter issues or potential problems with the ECU 10, it is viewed as an advantage of the present invention that the monitor processing and communications unit 20 can be temporarily coupled to the ECU 10 and as such be used with a plurality of ECUs. As such, a single monitor processing and communications unit 20 could be used by a military unit to monitor and control any one of a plurality of ECUs at any given time. That is, the monitor processing and communications unit 20 can be disconnected from a first ECU and connected to a second ECU exhibiting operating parameter issues. Of course, by designing the system such that the monitor processing and communications unit 20 is a distinct device separate from the ECU 10 and detachably connected to the ECU presents cost savings to the military not only in the number of units 20 which must be provided, but also in size and weight considerations of the equipment which must be transported.

Figure 7:
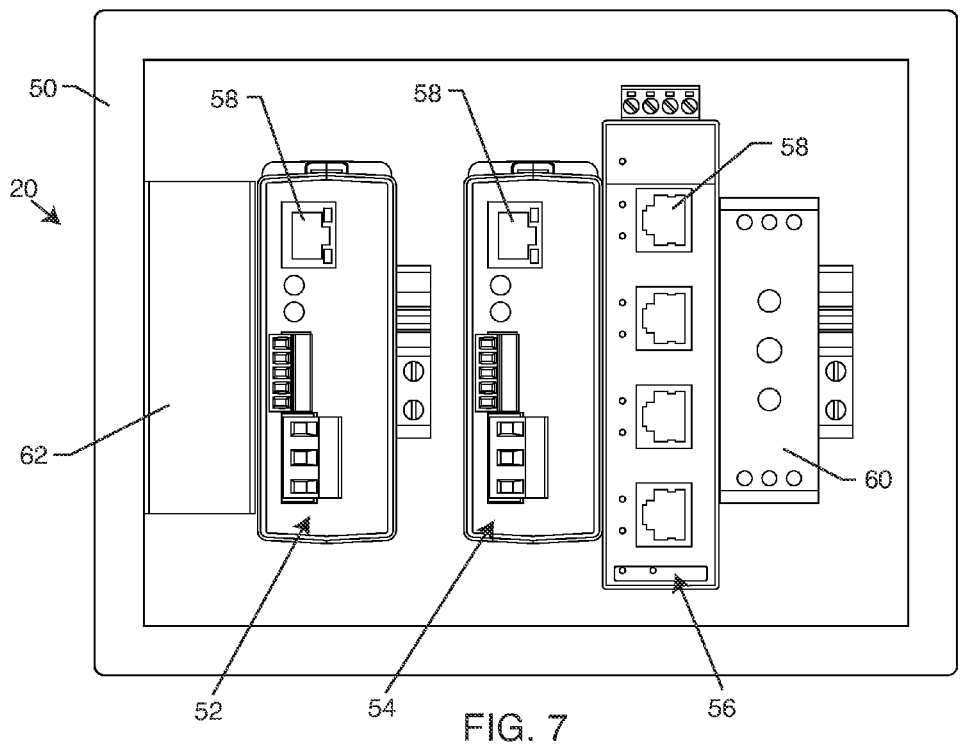
FIG. 7 is a top internal view of the components of the monitor processing and communications unit of the present invention.

With particular reference now to FIG. 7, the monitor processing and communications unit 20 contains multiple modules within the housing 50 thereof. A temperature module 52 receives and processes temperature data signals received from the temperature sensors of the ECU. The temperature module 52 also relays various commands to the ECU, including heating, fan and cooling commands. As such, the temperature module 52 is in communication and coupled with connector port 40. The temperature module 52 monitors and controls the ECU and has data logging capabilities. Historical data is stored in its internal memory for later extraction if necessary. The temperature module 52 can monitor multiple temperature sensors either mounted internally or externally to the ECU 10.

The temperature module 52 can be configured as a thermostat to control multiple separate relay outputs. As an example, relay 1 can be ECU heat, relay 2 can be ECU cool, and relay 3 can be evaporator fan (see FIG. 11). These relays can be turned on or off from a remote location through the Intranet/Internet network or automatically turned on and off based on temperature readings obtained from the temperature module 52 and the associated digital temperature sensors of the ECU 10.

Figure 8:
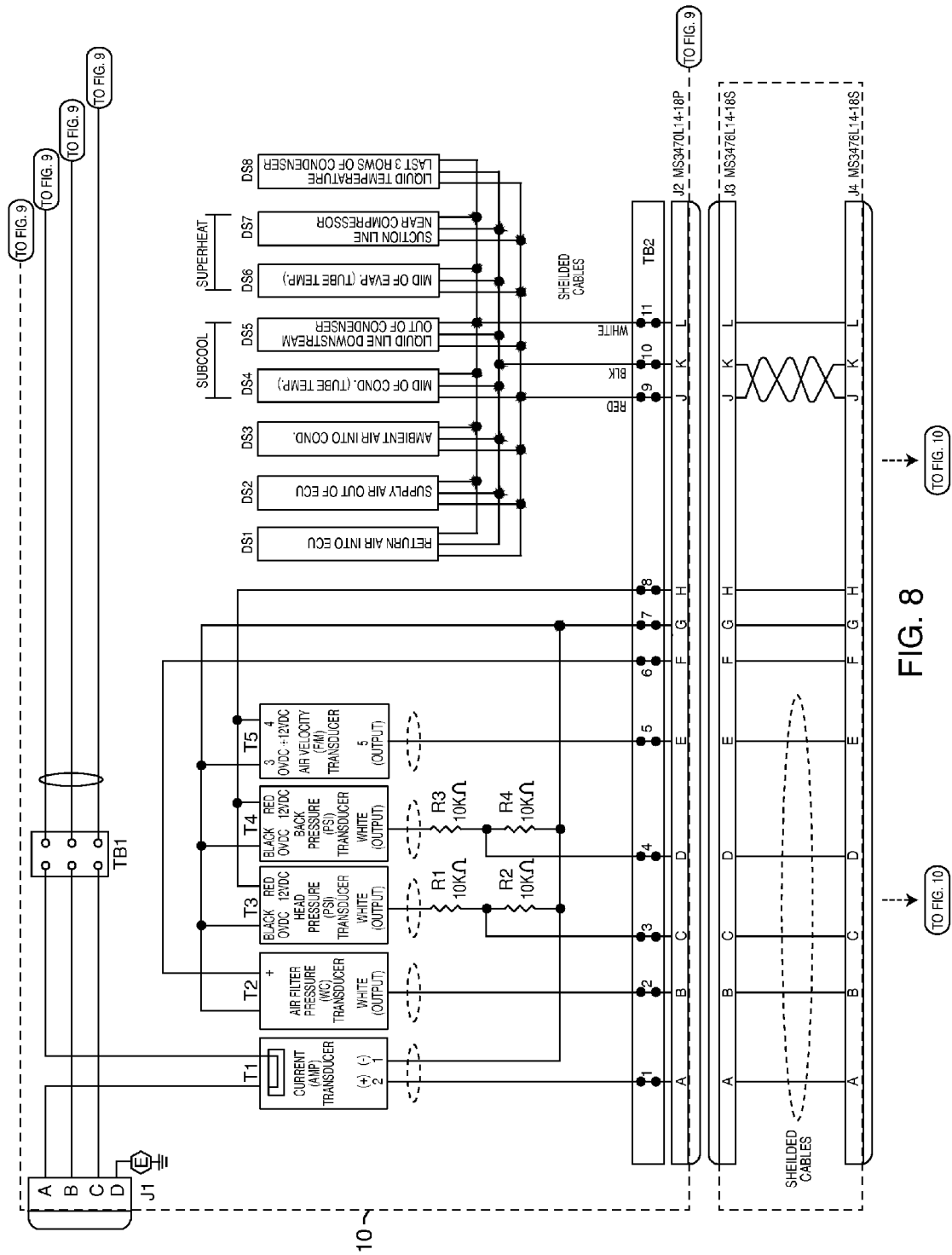
FIGS. 8-11 are detailed schematics illustrating the components and interaction between the ECU and monitor processing and communications unit of the present invention.
Figure 9:
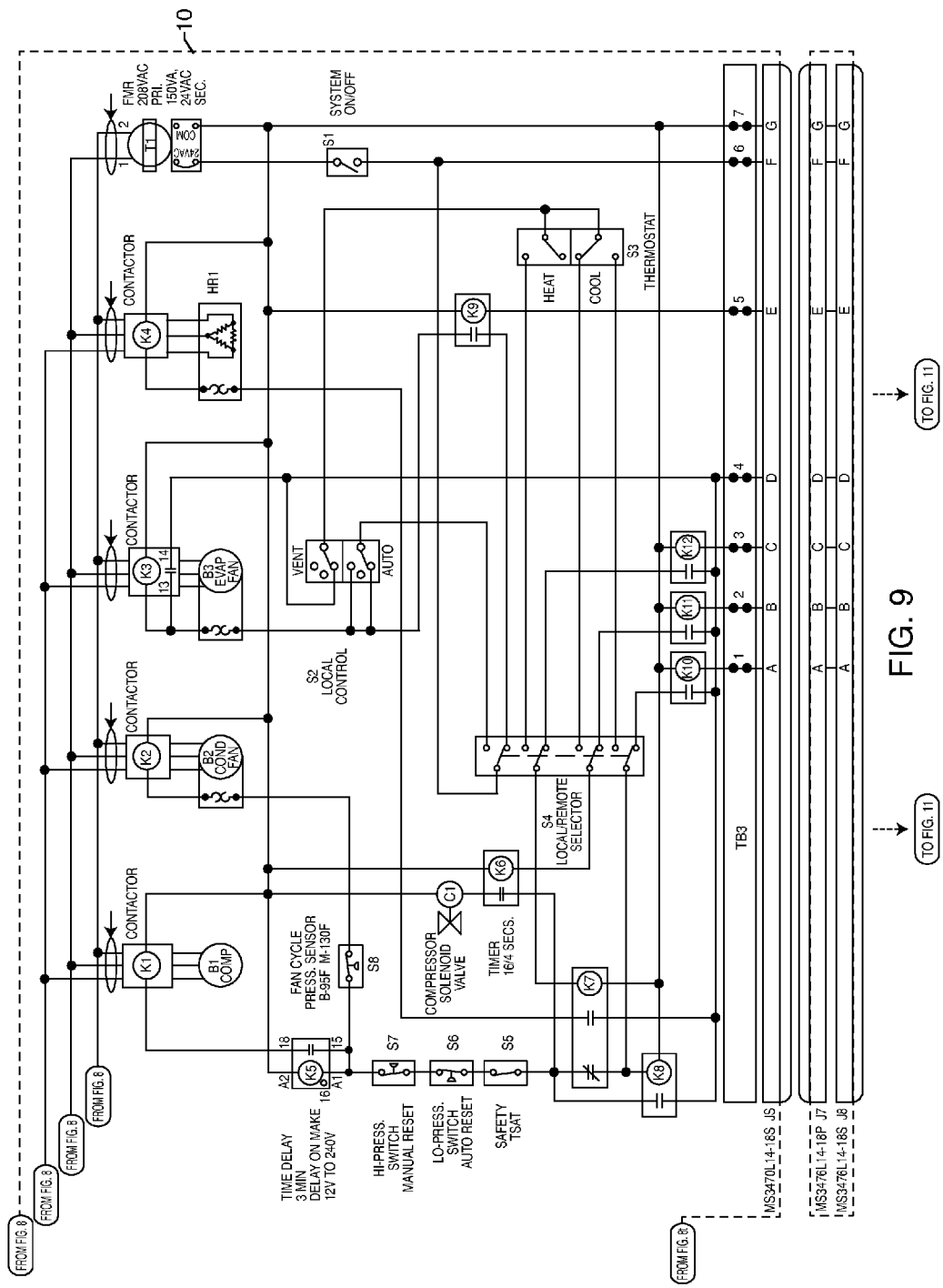
Figure 10:
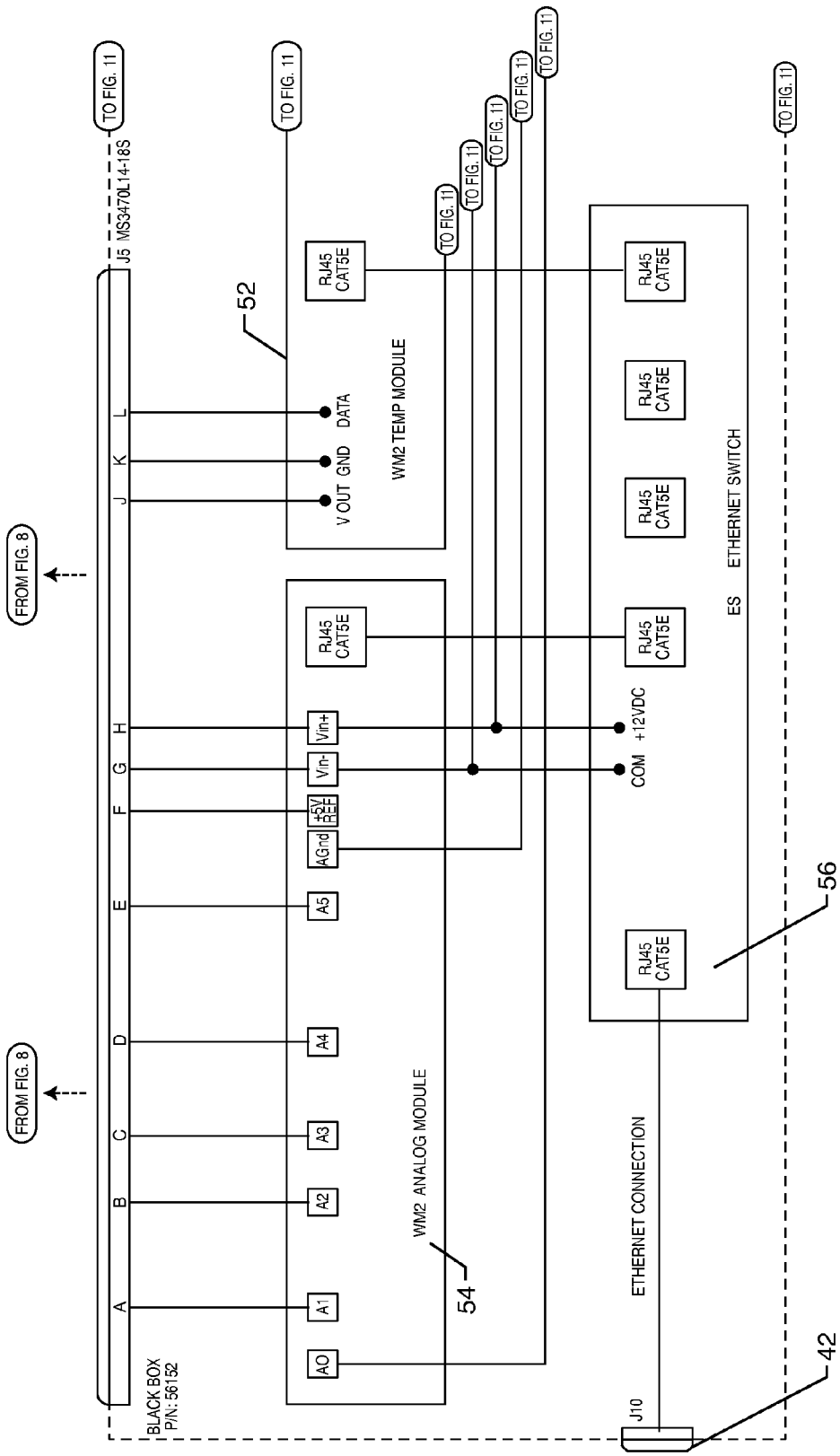
Figure 11:
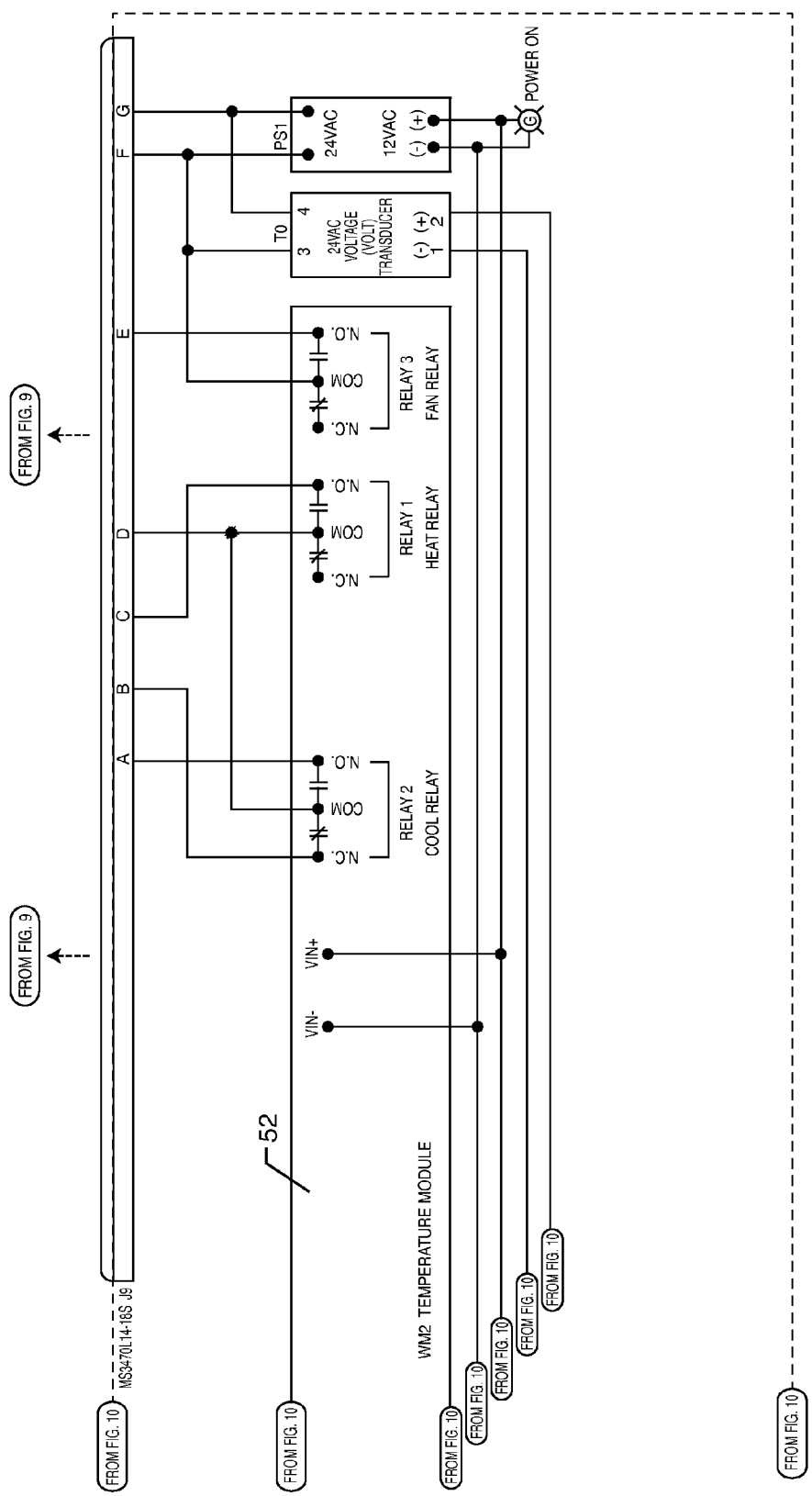

With reference to FIGS. 8-11, the WM2 temperature module 52 is shown in FIG. 10 extending to FIG. 11. The heat relay, cool relay and fan relay are shown connected to a heat/cool thermostat S3 and vent S2 switches (see FIG. 9) control circuits of the ECU 10 via the relays and wiring harness. The compressor B1, air conditioner fan B2, evaporator fan B3, and heater HR1 are electrically connected to the thermostat S3 and vent S2 switches, as illustrated in FIG. 9. Thus, the temperature module 52 may be used to automatically or selectively turn on or off the heater, compressor, fans and the like of the ECU.

With reference to FIG. 9, an electronic circuit is provided in the system, illustrated in the ECU control circuit as local/remote selector S4, for selectively switching control of the operation of the ECU between local and remote control. The ECU will have various switches, as dials, and other input mechanisms so as to be manually operated on site. However, when coupled with the monitor processing and communications unit 20 of the present invention, the service technician may switch the controls from local control to remote control. This enables the remote technician to control various operating parameters of the ECU remotely, such as through the computerized graphical interface display device 22 and by means of the monitor processing and communications unit 20. If the monitor processing and communications unit 20 is to be disconnected from the ECU 10, the local/remote selector switch S4 can be selectively switched to local control such that the military personnel can adjust the ECU 10 manually on site as needed. Moreover, when a remote service technician is monitoring and diagnosing the ECU 10, switching to remote control of the ECU 10 ensures that the remote service technician is controlling the operating parameters of the ECU 10 and need not worry about on-site personnel adjusting or selecting other operating parameters of the ECU which would make it difficult to monitor, diagnose or operate the ECU properly.

With reference now to FIG. 8, ECUs 10 provided in accordance with the system of the present invention include a plurality of temperature sensors formed integrally therewith. Alternatively, existing ECUs can be retrofitted with the necessary temperature sensors, either externally or internally. The digital temperature sensors referred to in FIG. 8 are as follows: DS1, return air into the ECU, or the temperature of the air returning from the conditioned space; DS2, supply air out of the ECU, or the temperature of the air entering into the conditioned space; DS3, ambient air into the condenser coil, or outside air temperature; DS4, condensing temperature; DS5, liquid line refrigerant temperature, measured downstream out of the condenser coil; DS6, evaporator temperature; DS7, compressor suction line refrigerant temperature as measured near the compressor; and DS8, condenser exiting air temperature, or air temperature after passing through the condenser coil. Temperature sensors DS4 and DS5 work together to calculate sub-cool readings, while DS6 and DS7 work together to calculate super-heat readings. The data signals from these temperature sensors DS1-DS8 are sent to the temperature module 52 for processing, storage, and relaying to the computerized graphical display device 22.

The monitor processing and communications unit 20 also includes an analog module 54 within the housing 50. This module 54 also monitors ECU functions and readings. However, it typically does not log data or provide control of any portion of the ECU. With reference to FIGS. 8 and 10, the analog module is in communication with a plurality of analog sensors (T1-T5) of the ECU, such as by means of the wiring harness interconnected between the ECU 10 and the cable connector port 38.

As shown in FIG. 8, the ECU 10 includes a plurality of analog sensors which read voltage input signals (0-5 VDC) and convert back to any measurement such as alternating current voltage (VAC), amperage (AMP), pressure per square inch (PSI), or feet per second. Each transducer sensor T1-T5 is utilized to convert the measurement from a raw data value to a 0-5 VDC signal. This voltage signal is then sent to the analog module for processing and relaying to the computerized graphical user interface display device 22. The analog module 54 is accessible through the network, typically the Internet or Ethernet through an assigned IP address. Typically, no special software is required to access the analog module 54, although a setup page is preferably password protected.

In FIG. 8, five transducers or analog sensors T1-T5 are illustrated, and detect or sense current amperage, air filter pressure, head pressure, back pressure, and air velocity of the ECU 10. The transducers or analog sensors monitor the twenty-four volts alternating current control voltage from the ECU transformer and current on the incoming power line. These readings can determine if there is a problem with the supplied power or if a component of the ECU is failing. Differential air pressure can determine whether there is a dirty return air filter or possibly an obstruction preventing proper airflow. The head pressure monitors refrigeration system head pressure from 0-750 psi on the high side, and the back pressure monitors the refrigeration system back pressure from 0-200 psi on the low side. The air velocity sensors measure supply airflow from 0-2500 feet/minute and converts to actual air compressor capacity (ACFM).

With reference again to FIG. 7, the monitor processing and communications unit 20 also includes an Ethernet switch or web server module 56 within the housing 50 and operably connected to the temperature module 52 and analog module 54. The web server module 56 allows access to the data being received and analyzed by the monitor processing and communications unit 20. Through the web server module 56, users and technical support personnel can remotely view the same information the local user and operator is viewing in real time to assist in troubleshooting of system performance issues. The web server module 56 is user programmable to a specific Internet Protocol (IP) address, thereby restricting access to system information from outside entities. Preferably, firewalling of the computer work station further disables unauthorized access. A virtual private network (VPN) may be established between the manufacturer or technical support and the ECU 10/monitor processing and communications unit 20 to enable the manufacturer or technical support personnel to access these devices and only those computers in communication must go through a router first so that the signals and information thereof are visible only inside the network. An exemplary web module 56 which can be used is the X-300™ offered by Zytronix Research & Design, Inc.

With continuing reference to FIG. 7, it will be noted that the temperature module 52, analog module 54 and Ethernet switch/web server module 56 each include at least one communication port 58, such as a RJ45 connection, for reception of an appropriate communications cable, such as CAT5E, for coupling temperature module 52 and analog module 54 to the web server module 56 for access and communication through the network by the computerized graphical user interface display device 22.

With reference to FIGS. 7 and 11, the monitor processing and communications unit 20 also includes a voltage transducer 60 (typically 24 VAC) for monitoring the voltage of the ECU 10, as well as a power supply 62, which receives power (typically 24 VAC) from the ECU 10 and converts it to a lower voltage (12 VAC) for use by the transducer 60, temperature module 52, analog module 54 and web server module 56. As such, in a particularly preferred embodiment the monitor processing and communications unit 20 does not need a separate power source and instead receives its power from the ECU 10. The ECU may include a power generator or be coupled to a power generator, or receive its power from some other external source.

As described above, the system of the present invention is specifically adapted for incorporation with military ECUs. As such, when the invention is externally mounted to a military ECU, the enclosure is military ruggedized, so as to be NEMA 4X (IP65) rated. In the event an ECU is to be retrofitted, a wiring harness consisting of the digital temperature sensors DS1-DS8 must be installed inside the ECU 10, and a second wiring harness containing the transducers (T1-T5) must be appropriately installed within the electrical and refrigeration system of the ECU. Moreover, existing ECU controlled wiring must be modified to install a military specification mating connector on an accessible exterior surface of the ECU. The connectors used on the ECU and on the monitor processing and control unit 20 are typically bayonet-style connectors with positive latching features to ensure that connections remain secure. The enclosure, wires, connectors, etc. as described above meet the necessary military standards and specifications so as to be mounted onto or incorporated into the military ECU and meet the demands of extreme temperature, environment, use, etc. that the military ECU may be subjected to.

The system of the present invention, as described above, allows full control and remote adjustment of ECUs to optimize performance and reliability while deployed in the field. The system further gives the operator the tools and information required for self-sustainment in forward locations while allowing the sharing of data via a network with the manufacturer or technical support personnel. The system of the present invention is a tool used by both the local operator and the manufacturer's service representatives to diagnose, adjust and monitor the ECU's performance. The system allows technical support personnel to see, in real time, what problems or performance issues exist or may occur on an ECU remotely and offer corrective action. This is particularly useful in the military setting to avoid failures of the ECU and related equipment and having tactical missions unnecessarily aborted due to the secondary equipment failures due to lack of cooling air provided by the ECU.

Although several embodiments have been described in detail for purposes of illustration, various modifications may be made without departing from the scope and spirit of the invention. Accordingly, the invention is not to be limited, except as by the appended claims.

What is claimed is:
1. A system for monitoring the performance of an environmental control unit (ECU), comprising:
 a mobile ECU;
 sensors for monitoring and detecting operating parameters of the ECU;
 a monitor processing and communications unit coupled to the sensors for receiving and processing operating parameter data signals from the sensors and relaying the processed operating parameter data signals; and
 a computerized graphical user interface display in communication with the monitor processing and communications unit for graphically displaying the processed operating parameter data signals;
 wherein the monitor processing and communications unit comprises:
 a temperature module that receives and processes temperature data signals from ECU temperature sensors, and relays heating, fan and cooling commands received from the computerized graphical user interface display to the ECU;
 an analog module that receives and processes pressure, air velocity and current sensor signals of the ECU;
 an ethernet switch in communication with the temperature module, the analog module and the computerized graphical user interface display; and
 a voltage transducer and power supply for receiving and converting power from the ECU and delivering power to the temperature module, the analog module and the ethernet switch.

2. The system of claim 1, wherein the ECU is a mobilized military ECU.

3. The system of claim 2, wherein the monitor processing and communications unit is military ruggedized.

4. The system of claim 1, wherein the sensors are formed integral with the ECU.

5. The system of claim 4, wherein the monitor processing and communications unit is detachably coupled to the sensors and ECU.

6. The system of claim 1, wherein the sensors monitor or detect temperature, pressure, air velocity, and electrical current operating parameters of the ECU.

7. The system of claim 1, wherein the computerized graphical user interface display is connected to the monitor processing and communications unit via a communications network.

8. The system of claim 7, wherein the network comprises a local area network.

9. The system of claim 7, wherein the network comprises a wide area network.

10. The system of claim 9, wherein the ECU and monitor processing and communications unit are at the same location and the computerized graphical user interface display is at a remote location and in communication with the monitor processor and communications unit for remotely monitoring and controlling the operation parameters of the ECU.

11. The system of claim 1, including means for selectively switching control of the operation of the ECU between local and remote control.

12. The system of claim 1, wherein the monitor processing and communications unit comprises means for receiving and processing sensor data signals, means for relaying processed sensor data signals to the computerized graphical user interface display, and means for controlling operating parameters of the ECU.

13. A system for monitoring the performance of an environmental control unit (ECU), comprising:
 a mobile ECU including sensors for monitoring and detecting operating parameters of the ECU, the operating parameters including temperature, pressure, air velocity and electrical current of the ECU;
 a monitor processing and communications unit detachably coupled to the ECU for receiving and processing operating parameter data signals from the sensors and relaying the processed operating parameter data signals; and a computerized graphical user interface display in communication with the monitor processing and communications unit via a network for graphically displaying the processed operating parameter data signals received from the monitor processing and communications unit;

wherein the monitor processor and communications unit comprises:

a temperature module that receives and processes temperature data signals from ECU temperature sensors, and relays heating, fan and cooling commands received from the computerized graphical user interface display to the ECU;

an analog module that receives and processes pressure, air velocity and current sensor signals of the ECU;

an ethernet switch in communication with the temperature module, the analog module and the computerized graphical user interface display; and a voltage transducer and power supply for receiving and converting power from the ECU and delivering power to the temperature module, the analog module and the ethernet switch.

14. The system of claim 13, wherein the ECU is a mobilized military ECU.

15. The system of claim 14, wherein the monitor processing and communications unit is military ruggedized.

16. The system of claim 13, wherein the network comprises a wide area network and wherein the ECU and monitor processor and communications unit are at the same location and the computerized graphical user interface display is at a remote location and in communication with the monitor processor and communications unit for remotely monitoring and controlling the operation parameters of the ECU.

17. The system of claim 13, including means for selectively switching control of the operation of the ECU between local and remote control.

18. A device for monitoring and controlling a mobile environmental control unit (ECU), the device comprising:

a housing;

a temperature module within the housing that receives and processes temperature data signals received from temperature sensors of the ECU, and relays heating, fan and cooling commands to the ECU;

an analog module within the housing that receives and processes pressure, air velocity and current data signals from the ECU;

an ethernet switch within the housing in electronic communication with the temperature module and the analog module; and a voltage transducer and power supply for receiving and converting power from the ECU and delivering power to the temperature module, the analog module and the ethernet switch.

19. The device of claim 18, wherein the device is military ruggedized.

20. The device of claim 18, including a first cable connector port for detachably connecting the device to the ECU and receiving pressure, air velocity and current data signals from the ECU, wherein the first cable connector is in communication with the analog module.

21. The device of claim 18, including a second cable connector port for detachably connecting the device to the ECU and receiving temperature data signals from the ECU, and relaying heating, fan and cooling commands to the ECU, wherein the second cable connector is in communication with the temperature module.

22. The device of claim 18, including a data connector port for detachably connecting the device to a computerized graphical user interface display.

* * * * *